(12) United States Patent
Bergsma et al.

(10) Patent No.: US 6,851,315 B2
(45) Date of Patent: Feb. 8, 2005

(54) HERMETIC FUEL LEVEL SENDER

(75) Inventors: Rudolph Bergsma, Ann Arbor, MI (US); Gary D. Cochran, 2870 Page Ave., Ann Arbor, MI (US) 48104

(73) Assignees: Rudolph Bergsma Trust, Ann Arbor, MI (US); Gary D. Cochran, Ann Arbor, MI (US)

( * ) Notice: Subject to any disclaimer, the term of this patent is extended or adjusted under 35 U.S.C. 154(b) by 0 days.

(21) Appl. No.: 10/373,955

(22) Filed: Feb. 26, 2003

(65) Prior Publication Data

US 2003/0159507 A1 Aug. 28, 2003

Related U.S. Application Data

(60) Provisional application No. 60/360,337, filed on Feb. 26, 2002, and provisional application No. 60/370,058, filed on Apr. 4, 2002.

(51) Int. Cl.[7] .............................................. G01F 23/32
(52) U.S. Cl. ......................... 73/317; 73/290 R; 73/305; 73/313
(58) Field of Search ........................... 73/317, 313, 309, 73/290 R, 305, 314

(56) References Cited

U.S. PATENT DOCUMENTS 4,229,973 A * 10/1980 Hara ............................ 73/317
4,532,491 A * 7/1985 Rau et al. ..................... 338/33
4,557,144 A * 12/1985 Lucchini ....................... 73/313

OTHER PUBLICATIONS

Eric LeBreton, "Confined Space", Spring 1996, TDG Dangerous Goods ewsletter, vol. 16, No. 1.*

Abstract of Aircraft Accidnet Report for the In–Flight Breakup over the Atlantic Ocean of Trans World Airlines Flight 800, NTSB No. AAR–00/03.*

* cited by examiner

Primary Examiner—Hezron Williams
Assistant Examiner—Rodney T. Frank
(74) Attorney, Agent, or Firm—George L. Boller (57) ABSTRACT

An in-tank fuel level sender (26) for signaling the level of liquid fuel in a motor vehicle fuel tank (22). An enclosure (31) forming a hub of the sender provides an interior that is sealed against intrusion of fuel. An actuator (110, 122) is positionable on an exterior of the enclosure in correlation with liquid fuel level. A movement (52) within the interior of the enclosure follows the positioning of the actuator. An electric circuit element (62; 86) within the interior of the enclosure is operated by the movement to provide an electric characteristic for transmission through the enclosure to signal the liquid fuel level.

18 Claims, 6 Drawing Sheets

HERMETIC FUEL LEVEL SENDER

REFERENCE TO RELATED APPLICATIONS AND PRIORITY CLAIMS

This non-provisional application derives from the following commonly owned co-pending patent applications, the priorities of which are expressly claimed: Provisional Application No. 60/360,337, filed on 26 Feb. 2002 in the name of Rudolph Bergsma and bearing the title HERMETIC FUEL LEVEL SENDER; and Provisional Application No. 60/370,058, filed on 04 Apr. 2002 in the name of Rudolph Bergsma and bearing the title HERMETIC FUEL LEVEL SENDER.

FIELD OF THE INVENTION

This invention relates to float-operated senders that are associated with fuel tanks of motor vehicles to transmit a value of a parameter representing the level of liquid fuel in a tank to instrumentation that uses the value to operate a display that presents information related to the level of fuel in the tank to a driver of the vehicle.

BACKGROUND OF THE INVENTION

One type of sender that is used in motor vehicles comprises a resistor card that is disposed in a fuel tank in a manner that exposes it to whatever fuel is used by the vehicle (gasoline and/or alcohol for example), including fuel additives, sour gas, and/or contaminants. The sender is operated by a float that follows the level of liquid fuel in the tank. As the float assumes different levels within the tank, its motion is transmitted by a float rod, or arm, to a contact arm, causing a contact on the arm to move along a succession of commutator bars extending from locations along the length of a resistor track printed on a resistor card, thereby selecting a portion of the resistor in correlation with the level of the float. The selected portion provides a variable resistance that is electrically connected with instrumentation that operates a fuel gauge that can be observed by the driver. The float rod is mounted for pivotal movement via a bearing, and the float is disposed at an end of the rod opposite the bearing. As the float moves, the rod imparts pivotal motion to the contact arm, causing its contact to move in an arc along the succession of commutator bars, changing the value of the variable resistance as it moves. In that design for a resistive type fuel level sender, the commutator bar contact produces a result similar to a contact moving in an arc along a potentiometer or variable resistor track, changing the value of the variable resistance as it moves.

The force that the contact is able to apply against the resistor on the resistor card is important in enabling the sensor to provide a service life that will meet relevant specifications. Over the life of a sender the force that the contact exerts on the resistor may vary for one or more different reasons, such as fuel slosh in the tank and/or looseness in the bearing. The use of a silver palladium alloy as the resistor commutator may reduce the effects of those factors. Nonetheless the contact may at times lose contact with the resistor, creating a momentary open circuit. Events that may cause such open circuits include intrusion of foreign particles between the contact and the resistor, corrosion of the commutator, oxidized fuel coating, and high-G loads experienced by the sender. Momentary open circuits create excess wear on the contact and the resistor commutator.

A sender that precludes those undesirable possibilities and that meets certain cost objectives is therefore seen to be a desirable improvement.

The durability and accuracy of a fuel sender are also important, especially where a motor vehicle manufacturer warrants a fuel system and/or its components either for legal compliance and/or by competitive considerations. Failure to meet relevant compliance criteria can expose a motor vehicle manufacturer to costly penalties and/or warranty claims.

Accordingly, it is believed that a sender that provides both increased durability and accuracy over an extended period would be a significant improvement in the state of the art.

U.S. Pat. Nos. 3,739,641 and 4,987,400 describe gauges having magnetically driven senders in which the contacts are housed within sealed enclosures. The gauge of U.S. Pat. No. 3,739,641 is sealed against intrusion of volatile vapors that may accumulate from many sources and might ignite from a spark. An example given is in the bilge of a marine vessel. The gauge of U.S. Pat. No. 4,987,400 is said to be ultrasonically sealed for withstanding at least eight inches of mercury pressure differential. Both patents teach the use of an external magnet driving a magnet internal to the enclosure where the magnet is rotated by a coupling to a float. The enclosure materials are not selected to be highly impermeable to fuel or fuel vapors, only sufficient to prevent spark ignition.

Considerations in the prevailing design of motor vehicle fuel systems either tacitly or explicitly mandate that the fuel sender be contained within the fuel tank where it may at times be immersed in liquid fuel. A contact-containing enclosure that is external to a tank, as in U.S. Pat. Nos. 3,739,641 and 4,987,400, is not seen to be suitable for placement in a fuel tank of a motor vehicle where it must withstand immersion in a hostile liquid fuel that can at some times be quite hot and at others, quite cold, and that may contain various contaminants, additives, foreign substances, etc.

Accordingly, it is believed that an in-tank fuel sender for a motor vehicle that maintains its accuracy when exposed to liquid fuels, especially liquid fuels like gasoline, over an extended period would be another significant improvement in the state of the art.

Prevailing fuel system design practices in the automotive industry employ a fuel pump module that is assembled into a fuel tank, typically through an opening in a top wall of the tank that is subsequently closed. A fuel sender is typically part of the fuel pump module. Certain of the known systems comprise a fixed mounting of the sender in an assembly that is installed in a tank. The assembly has a construction that forces its lower end against a bottom wall of the tank thereby bodily positioning the sender within the tank relative to the bottom wall.

Accordingly, an in-tank fuel sender that can be conveniently assembled into fuel pump modules is also seen desirable.

SUMMARY OF THE INVENTION

The present invention relates to a novel fuel sender for a motor vehicle fuel tank that possesses features and characteristics: that render the sender suitable for in-tank placement in a motor vehicle fuel system where it is exposed to liquid fuel, including convenient mounting on a fuel pump module; that endow the sender with continued accuracy over an extended period, enabling it to comply with increasingly stringent specifications; and that make the sender quite cost-effective considering the increasingly stringent demands that may be imposed on it by motor vehicle manufacturers.

A presently preferred embodiment of the invention provides a novel sender having a central hub comprising a sealed enclosure in which a contact arm and a resistor card are disposed. The enclosure is preferably filled with a non-conducting fluid, such as a light oil. Force of a contact on the contact arm against a commutator on the resistor card will be essentially insensitive to influences, such as particle intrusion and fuel slosh, that otherwise might cause momentary open circuits, with contact-to-resistor card force remaining more consistent over the useful life of the sender. Contact-to-resistor card arcing is unlikely, but any arcing that might occur, such as due to a high-G force, will not be exposed to fuel or fuel vapor.

The enclosure is formed by a low permeable casing, or housing, preferably a non-magnetic stainless steel, and a low permeable cover, preferably a non-metallic, fuel-tolerant synthetic material, which may be either transparent or opaque. The housing has a circular back, or rear, wall and a circular perimeter wall that extends forward from and perpendicular to the rear wall. The forward margin of the perimeter wall is crimped over a circular outer edge of the cover to forcefully hold the circular outer margin of the cover against a circular shoulder formed in an intermediate portion of the housing perimeter wall. A sealing gasket that is disposed between the housing shoulder and the cover margin seals the joint between the cover and housing in a manner that prevents both liquid fuel and fuel vapor from intruding into the enclosure interior that is cooperatively formed by the assembled cover and housing.

When installed within a fuel tank, the sender is disposed in an orientation that places a main center axis of the hub enclosure in a desired orientation. The hub is fixedly mounted in any suitable manner, such as by attachment to a wall of a fuel pump module. A movement actuating member that is external to the sealed enclosure and operated by a fuel level float is positionable relative to the central hub in correspondence with fuel level sensed by the float. As the float moves vertically up and down with changing fuel level in the tank, the movement actuating member is correspondingly positioned in relation to the sealed enclosure.

The contact aim is positioned by a movement within the interior of the sealed enclosure. The movement is supported within the enclosure for turning about the main center axis and forms one portion of a magnetic circuit whose other portion is formed by the movement actuating member. The movement and the movement actuating member are magnetically coupled such that the movement is forced to turn within the enclosure in correspondence with positioning of the movement actuating member relative to the exterior of the enclosure. In this way the movement is forced to follow the actuating member, and hence follow the level of liquid fuel in the tank.

The movement moves the contact arm contact along the commutator on the resistor card to change the resistance that is presented to an electric circuit connected to the sender. In this way, the sender enables the circuit to operate a fuel gauge that indicates to a driver of the motor vehicle the amount of fuel in the tank.

The movement provides the source of magnetism, while the movement actuating member comprises a magnetically conductive material. Turning of the movement actuating member causes substantial follower torque to be applied to the movement, thereby causing the movement to follow the turning of the actuating member with low hysteresis. Those features, in conjunction with the isolation of the commutator, its contact, and the resistor from fuel, enable the sender to perform with consistency and accuracy during the course of its useful life.

A general aspect of the invention therefore relates to an in-tank fuel level sender for signaling the level of liquid fuel in a motor vehicle fuel tank. An enclosure forming a hub of the sender provides an interior that is sealed against intrusion of fuel. An actuator is positionable on an exterior of the enclosure in correlation with liquid fuel level. A movement within the interior of the enclosure follows the positioning of the actuator. An electric circuit element within the interior of the enclosure is operated by the movement to provide an electric characteristic for transmission through the enclosure to signal the liquid fuel level.

Another general aspect relates to a method of calibrating such a sender.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
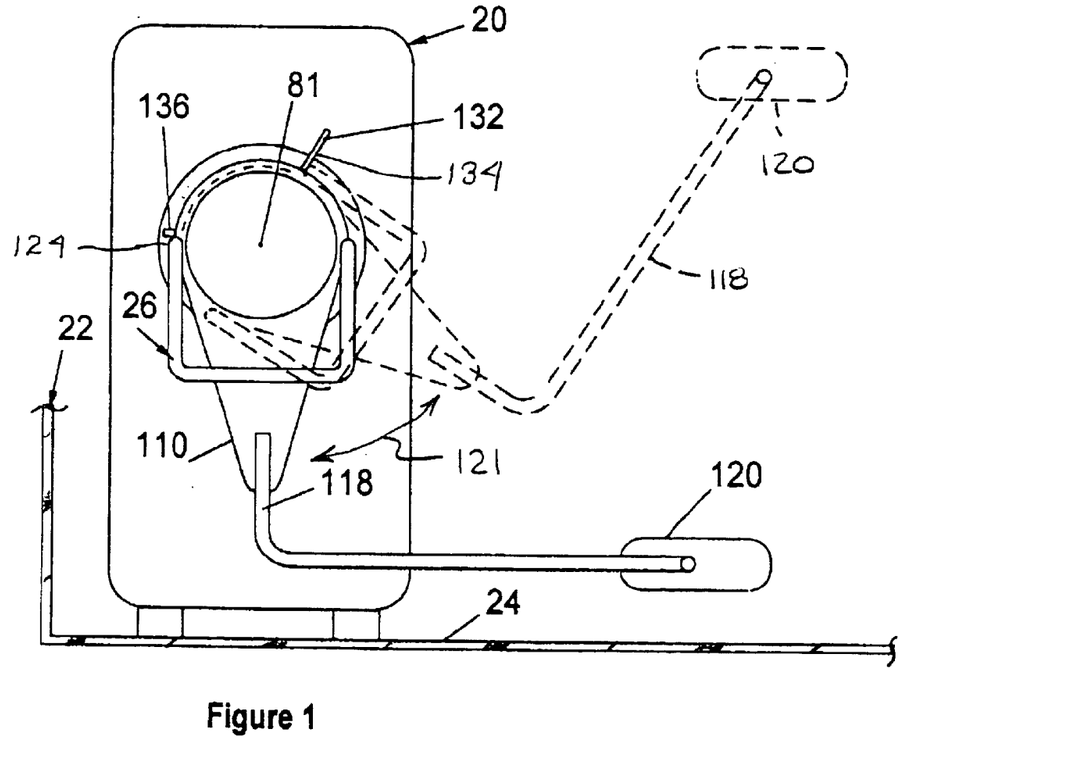
FIG. 1 is an elevation view of a fuel pump module disposed within a motor vehicle fuel tank and showing a front view of a sender, including a float rod and float, embodying principles of the invention.
Figure 2:
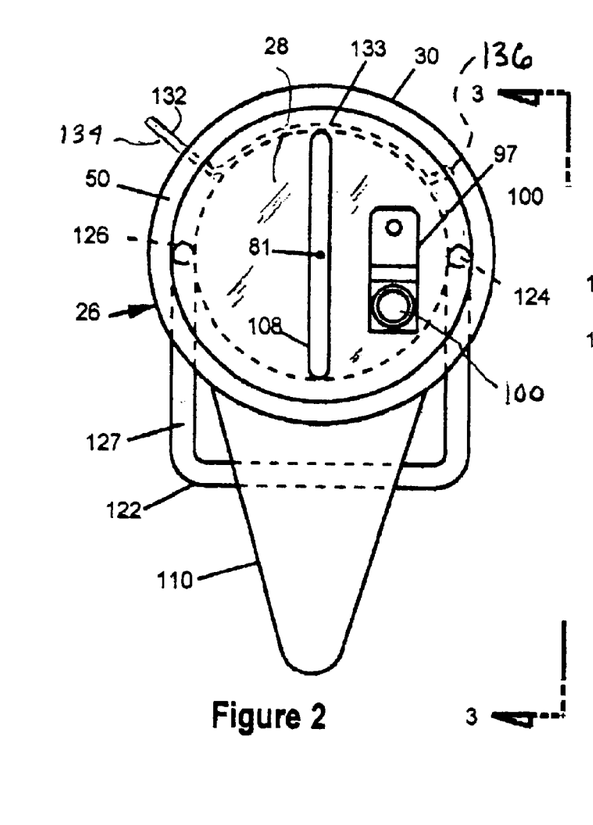
FIG. 2 is an enlarged rear view of the sender of FIG. 1 by itself, still in elevation, but with the float rod and float omitted and with a hub of the sender rotated counterclockwise a small amount and with an actuating plate of the sender in a different position for illustrative convenience.
Figure 3:
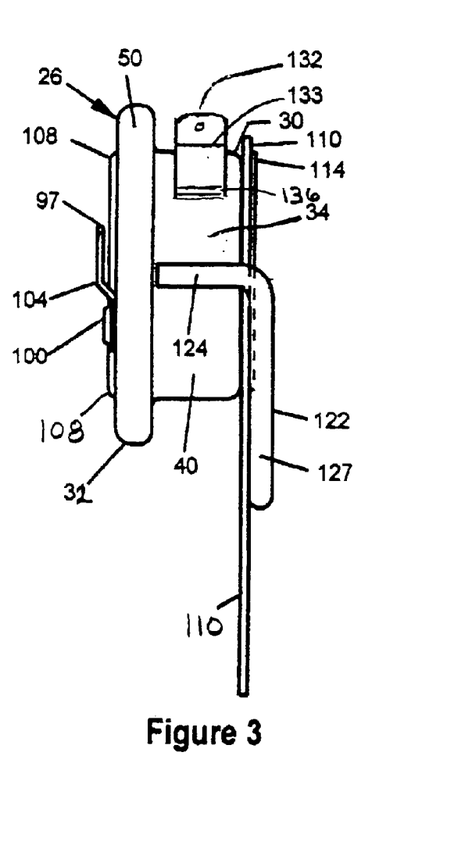
FIG. 3 is a right side view of FIG. 2, looking along line 3—3 in FIG. 2 in the direction of the arrowheads.

FIG. 1 shows a portion of a fuel pump module 20 that has been placed within a fuel tank 22 through an opening in a top tank wall (not shown) that is subsequently closed. The base of module 20 rests on a bottom wall 24 of tank 22 to set the elevation, within the tank, of a fuel level sender 26 embodying principles of the present invention.

Figure 7:
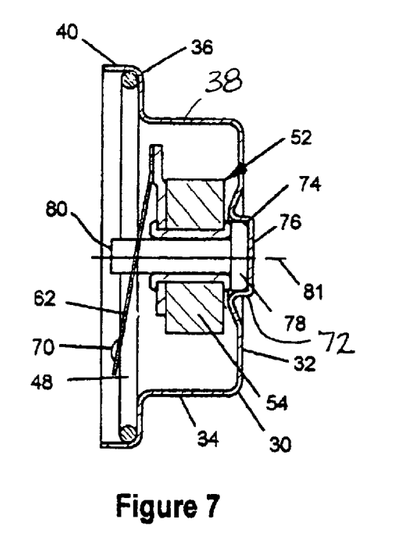
FIG. 7 is a cross section view along line 7—7 in FIG. 4 looking in the direction of the arrowheads.

FIGS. 2–5 show sender 26 to comprise a non-metallic cover 28 and a metal casing, or housing 30, that are assembled together to cooperatively form a sealed enclosure 31. Cover 28 is preferably a fuel-tolerant plastic, either transparent or opaque. Housing 30 is preferably a non-magnetic stainless steel that has been fabricated by drawing sheet stock into the general shape of a cup as shown by FIG. 7. The bottom of the cup forms a back, or rear, circular wall 32 and an immediately adjoining circular perimeter wall 34 that extends forward from rear wall 32. An intermediate portion of wall 34 comprises a circular shoulder 36 that separates a smaller diameter proximal portion 38 of wall 34 from a larger diameter distal wall portion 40 that forms the cup rim.

FIGS. 8–12 show cover 28 as essentially a circular disk that has an inner face 42, an outer face 44, and an outer margin that comprises a shouldered groove 46 on inner face 42. The outside diameter of cover 28 is slightly less than the circular inside diameter of distal wall portion 40 of housing 30. A circular sealing gasket 48 (FIG. 7) is disposed within the housing against shoulder 36. In preparation for assembly of cover 28 and housing 30, the housing is disposed with its rear wall facing vertically downward so that the open housing interior faces vertically upward. Such an orientation enables the interior of enclosure 31 to be filled with movement-damping and lubricating fluid, such as a light oil, if desired, by filling housing 30 before cover 28 is assembled to it.

Cover 28 is placed over housing 30 with inner face 42 facing and aligned with the open housing interior. The cover is then advanced, i.e. lowered, to fit the cover outer margin within wall portion 40 and seat groove 46 on gasket 48, thereby closing what would otherwise be the open front of the housing. Wall portion 40 is then rolled over, i.e. crimped, onto outer face 44, forcing the two parts 28, 30 together and compressing gasket 48 in the process to form sealed enclosure 31. The assembled condition can be seen in FIGS. 2 and 3 where the sealed joint that has been created endows the enclosure with a circular perimeter ridge 50 that can, if desired, be used for mounting the sender on module 20.

Figure 6:
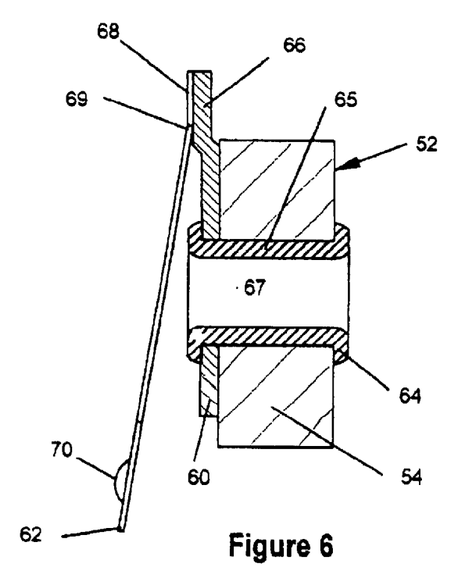
FIG. 6 is a view taken generally along line 6—6 in FIG. 4 in the direction of the arrowheads and on a larger scale.

Sender 26 comprises a movement, 52 shown by itself in FIG. 6. Movement 52 is housed within enclosure 31 as shown by FIG. 7. Movement 52 comprises a magnet 54 magnetized along its length (see FIG. 4 also) to provide respective North and South poles at opposite rounded tip ends 56, 58 respectively of the diameter of the movement. Magnet 54 has flat front and rear faces, giving it a uniform thickness, but it has a narrowing taper in the direction of each tip end. Movement 52 further comprises an electrically conductive contact arm mounting bracket 60 for mounting an electrically conductive contact arm 62 on magnet 54. An electrically conductive eyelet 64 holds the two parts 54, 60 together.

Before its association with parts 54, 60, eyelet 64 has a cylindrical shape, but with one end rolled over. Assembly of parts 54, 60 is accomplished by placing bracket 60 in front of the front face of magnet 54 with a through-hole 67 in the bracket aligned with a through-hole 65 in magnet 54, and then inserting the non-rolled-over end of eyelet 64 through the two aligned through-holes so that the non-rolled-over eyelet end protrudes rearward beyond the rear face of the magnet. Through-hole 65 is located at the center of magnet 54, midway between the magnet's tip ends 56, 58. The protruding rear end of the eyelet is then rolled over against the margin of through-hole 67 thereby forcing bracket 60 to be held flat against the front face of magnet 54 that is to confront inner cover face 42 in the completed sender.

Figure 4:
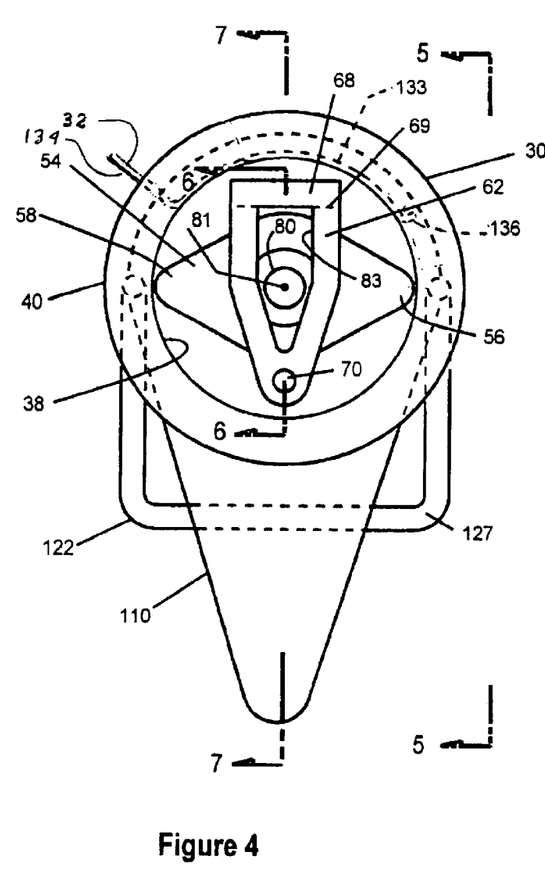
FIG. 4 is a view in the same direction as FIG. 2, but at a stage of fabrication of the sender where a cover is not yet in place, thereby allowing the interior of a movement-containing housing to be seen.
Figure 5:
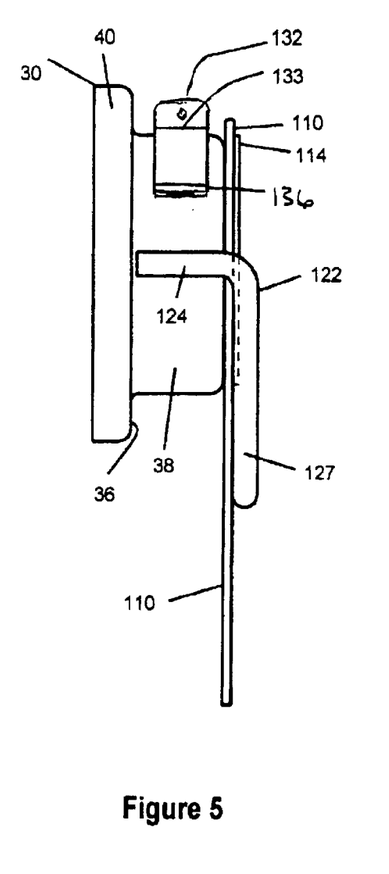
FIG. 5 is a right side view of FIG. 4, looking along line 5—5 in FIG. 4 in the direction of the arrowheads.

FIG. 4 shows that the length of contact arm mounting bracket 60 is at a right angle to that of magnet 54. FIGS. 6 and 7 show that one end of bracket 60 comprises a raised platform 66 to which a flat proximal end 68 of contact arm 62 is affixed, such as by welding in several spots. Contact arm 62 comprises a bend 69 that causes it to extend angularly away from end 68 in overlying relation to bracket 60. The tip, or distal, end of contact arm 62 comprises an electric contact 70 that can be either an integral formation in the arm, such as a dimple, one or more tines or fingers, or a separate contact element that is affixed to the arm by any suitable process.

FIG. 7 shows that rear housing wall 32 comprises an embossment 72 at its center. Embossment 72 is created during the drawing of the cup that forms housing 30. Embossment 72 is shaped to provide a circular depression, or pocket, 74 on the interior of enclosure 31 and a circular riser 76 on the exterior. Pocket 74 accurately and sturdily seats a circular head 78 of a post 80 so that the post extends within the enclosure along a central main axis 81 that is perpendicular to wall 32 and parallel to and concentric with perimeter wall portions 38, 40. Embossment 72 may be formed in a way that allows post 80 to be assembled to housing 30 by pressing head 78 into pocket 74. Additional means of attachment, such as welding or the like, may be used as appropriate.

As can be appreciated from consideration of FIG. 7, movement 52 is associated with housing 30 prior to placement of cover 28. With post 80 having been assembled to the housing, movement 52 is placed on post 80 by aligning eyelet 64 with the post and moving the two toward each other. Contact arm 62 has an aperture 83 (FIG. 4) that allows post 80 to pass through without interference. The placement of movement 52 on post 80 enables the movement to turn about axis 81.

Cover 28 is a molded synthetic part having several formations that are advantageous for the fabrication and operation of sender 26. Those formations can be seen in FIGS. 8–12. One formation is a shallow depression 82 in inner face 42 for locating a resistor card 84 on which a resistor 86 is disposed. A second formation is a small circular blind hole 88 at the center of face 42 into which the tip end of post 80 locates when the cover is assembled to housing 30.

Figure 12:
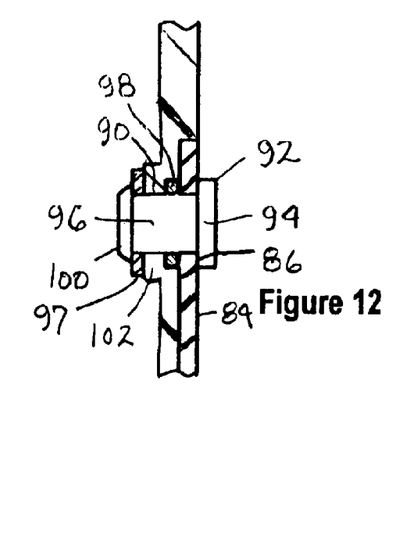
FIG. 12 is an enlarged cross section view as viewed along line 12—12 in FIG. 10 in the direction of the arrowheads.

A third formation shown in FIG. 12 comprises a shouldered through-hole 90 that provides for a sealed termination of resistor 86 to the exterior of enclosure 31 so that sender 26 can be connected to an electrical system that reads the fuel level signaled by the sender. The termination comprises an electrically conductive rivet 92 that passes through-hole 90. On the interior of enclosure 31, a head 94 of rivet 92 bears against an end of resistor 86. A shank 96 of the rivet extends from head 94, passing through a hole 95 in resistor card 84, through hole 90, and through a hole in the proximal end of an electric terminal 97 that is external to enclosure 31. An O-ring seal 98 seals the circumference of rivet shank to the wall of hole 90 proximate its shoulder. The distal end 100 of the rivet shank is rolled over to hold the proximal end of terminal 97 flat against a circular pad 102 that is locally raised on cover outer face 44 to complete this third formation in the cover. Terminal 97 comprises a step 104 leading to a blade 106 at its distal end adapted for mating connection with a wiring terminal (not shown) of the electrical system.

Figures 8, 9:
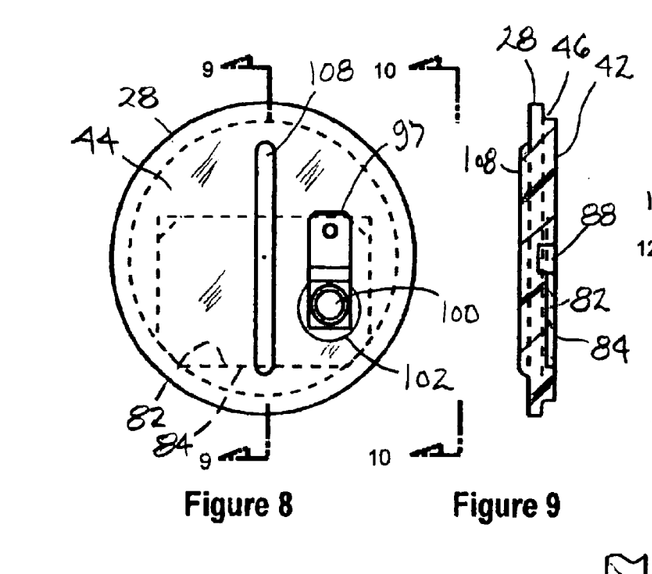
FIG. 8 is a view in same direction as the view of FIG. 2 showing the cover separate from the sender.
FIG. 9 is a cross section view as viewed along line 9—9 in FIG. 8 in the direction of the arrowheads.
Figure 10:
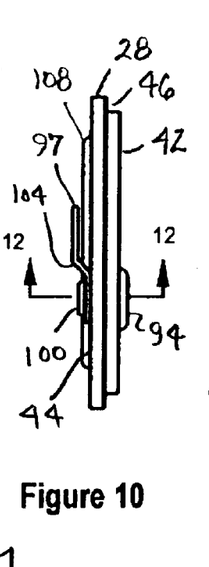
FIG. 10 is a right side view of the cover as viewed along line 10—10 in FIG. 8 in the direction of the arrowheads.

A fourth formation in cover 28 is a straight ridge 108 on front face 44 lying on a diameter of the cover but stopping short of the perimeter of the cover at both ends. Pad 102 and terminal 97 are disposed to one side of ridge 108, as shown by FIG. 8, with the length of blade 106 running parallel to ridge 108. Neither terminal 97 nor ridge 108 interfere with crimping of housing 30 to cover 28. As should be apparent, both terminal 97 and resistor card 84 are assembled to cover 28 prior to attachment of the cover to housing 30. As will become more apparent later from description of sender calibration, ridge 108 provides a feature for conveniently turning the cover on the housing prior to crimping of the housing to the cover.

As cover 28 and housing 30 are being assembled to form enclosure 31, contact 70 bears against resistor 86 with increasing pressure as the two parts move toward final position. Once the perimeter of cover 28 has engaged gasket 48, and the housing has been crimped to the cover, the angularly extending portion of arm 62 has been resiliently flexed to cause contact 70 to bear with a desired amount of force against resistor 86.

Figures 14, 17:
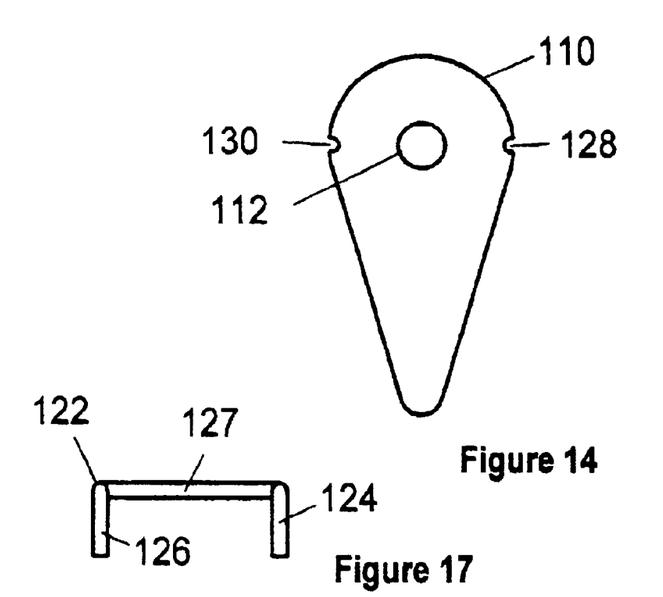
FIG. 14 is a plan view of the actuating plate of the sender shown by itself on substantially the same scale as FIG. 1.
FIG. 17 is top view of FIG. 16.
Figure 15:
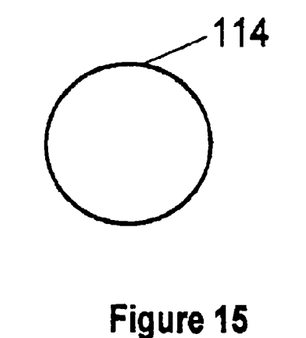
FIG. 15 is a plan view of a retainer of the sender shown by itself on substantially the same scale as FIG. 1.

Riser 76 of embossment 72 provides a bearing on which an actuating plate, or lever, 110 that is shown by itself in FIG. 14 can turn. Actuating plate 110 is essentially a flat non-magnetic metal plate, having a large end and a small end. The large end comprises a circular through-hole 112, that when the large end is placed behind and parallel with housing rear wall 32, and with hole 112 concentric with riser 76, allows the large end to be disposed against the rear housing wall with the riser fitting closely within hole 112. A circular retainer 114, shown by itself in FIG. 15, is then placed over the large end of actuating plate 110 to capture the latter on the housing. Riser 76 protrudes through hole 112 just enough to allow the center of retainer 114 to be disposed flat against the riser, and it is there that the retainer is secured by welding to the housing. Consequently, actuating plate 110 is captured on enclosure 31, but in a manner that allows it to freely turn on the housing riser about axis 81 with no significant looseness.

As can be seen in FIG. 1, one end of a suitably formed float rod, or arm, 118 is joined to actuating plate 110 in any suitably secure manner, such as welding, at a location spaced radially of housing 30. A level sensing float 120 is secured on the opposite end of rod 118 to follow the level of liquid fuel in tank 22. As float 120 moves up and down with changing fuel level, it turns actuating plate 110 about axis 81, as suggested by arrow 121.

Figure 16:
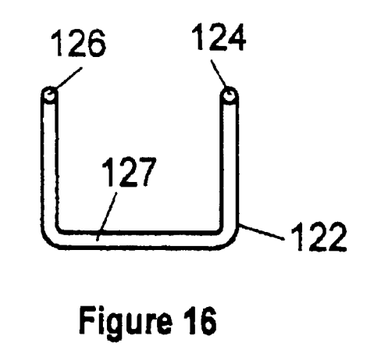
FIG. 16 is a view in the same direction as the view of FIG. 2 showing a magnet return conductor by itself on a slightly smaller scale than FIG. 2.
Figure 18:
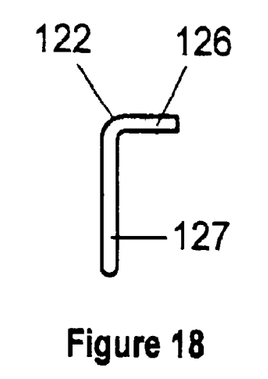
FIG. 18 is a left side view of FIG. 16.

Actuating plate 110 carries a magnet return conductor 122 that is shown by itself in FIGS. 16–18. Magnet return conductor 122 comprises a formed metal wire, or rod, of circular cross section that is formed to a shape that provides opposite end segments 124, 126 that, when assembled onto actuating plate 110, overlap, with suitable radial clearance, the exterior of larger diameter portion 40 of housing perimeter wall 34. Segments 124, 126 are parallel with axis 81, and are located 180° about axis 81. With segments 124, 126 so disposed, magnet 54 aligns between them, with tip end 56 confronting segment 124 and tip end 58 confronting segment 126. Magnetic flux from one of the magnet poles passes through the non-magnetic housing perimeter wall to the confronting one of the magnet return conductor segments. A yoke portion 127 of magnet return conductor 122 extends between segments 124, 126 to provide a return path for magnetic flux from one segment to the other. At the other segment, the flux passes back through the housing wall to the other magnet pole.

The circularly contoured perimeter edge of the large end of actuating plate 110 comprises two generally semi-circular notches 128, 130 diametrically opposite each other about axis 81. Those notches locate and seat magnet return conductor 122 on the large end, as shown by FIGS. 2–5, so that as actuating plate 110 turns on enclosure 31 about axis 81, segments 124, 126 similarly turn about the same axis. Because magnet 54 continually seeks alignment between segments 124, 126, the motion that actuating plate 110 imparts to magnet return conductor 122 causes movement 52 to follow the actuating plate movement. And because actuating plate 110 follows movement of float 120, movement 52 is forced to follow the level of liquid fuel in tank 22.

Figure 11:
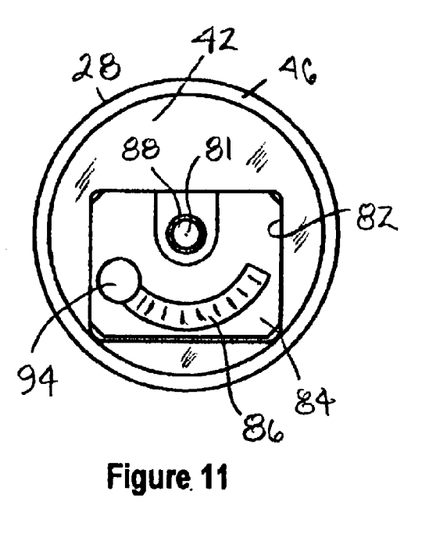
FIG. 11 is a rear view of FIG. 8.
Figure 13:
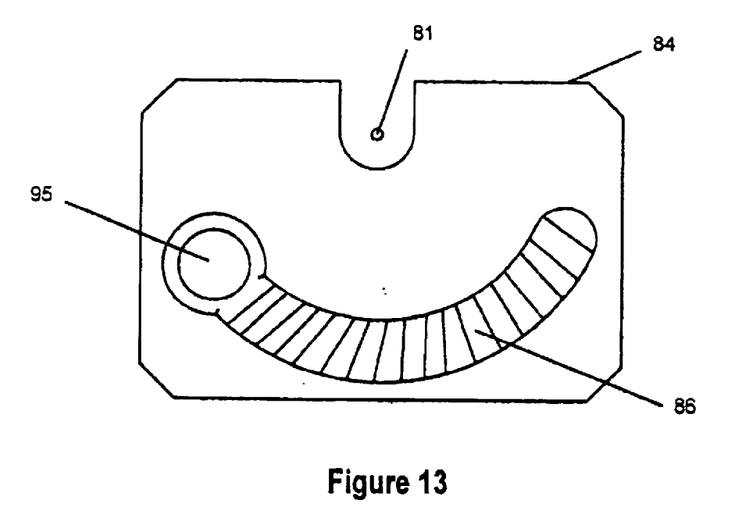
FIG. 13 is a view in the same direction as the view of FIG. 11 on an enlarged scale showing, by itself, a resistor card that mounts on the cover.

As shown by FIGS. 11 and 13, the length of resistor 86 runs along an arc that is generally circular about axis 81. Rivet 92 establishes electrical connection of one end of resistor 86 to terminal 97. Movement 52 is effective to position contact 70 along resistor 86 at various distances from rivet head 94 in correspondence with fuel level. The amount of resistance present between rivet 92 and contact 70 corresponds to the level of fuel sensed by float 120. Contact 70 is electrically connected to ground via grounding of contact arm 62 to housing 30 through bracket 60 and eyelet 54, with eyelet 54 being urged into contact with housing rear wall 32 by the magnetic attraction to return conductor 127 and by the force by the resiliently flexed contact arm 62 to keep the rolled-over eyelet end at the rear face of magnet 54 in continual contact with wall 32, even as movement 52 turns within enclosure 31.

Grounding of housing 30 is accomplished through a conductive electric terminal 132 (FIGS. 1–5) that is affixed to the exterior of housing perimeter wall portion 40. An intermediate portion 133 of the terminal is curved for conformance to the housing perimeter wall where it is affixed to the housing in any suitable manner such as welding. At one end the terminal has an upturned blade 134, and at the other end, a short upturned tab 136. Blade 134 is adapted for mating connection with a wiring terminal (not shown) of the electrical system. Blade 134 presents an interference to magnet return conductor segment 126 for limiting circumferential travel of actuating plate 110 in the clockwise direction, as viewed in FIGS. 2 and 4 when abutted by that segment. Tab 136 presents an interference to segment 124 for limiting circumferential travel of actuating plate 110 in the counterclockwise direction when abutted by that segment.

Turning of movement 52 within enclosure 31 can be damped and lubricated by filling the interior with a light oil, thereby immersing movement 52 and resistor 86 in a fluid medium, as mentioned earlier. Calibration of sender 26 occurs after cover placement, but before the housing is crimped onto the cover.

Calibration is performed with the aid of suitable equipment. First, before attaching float rod 118 to actuating plate 110, the resistance measured between terminals 132 and 97 must be properly correlated with the position of actuating plate 110. The proper resistance can be set for extra close tolerance for a low fuel signal point, such as empty, by holding actuating plate 110 at a particular position about axis 81 referenced to terminal 132, turning the cover via ridge 108 to obtain the proper resistance, and then crimping housing 30 to cover 28, as described above, to prevent cover turning. With this calibration, proper orientation of the sender in a fuel tank, or on a fuel module, uses terminal 132 as the reference. With the resistance having been properly correlated with actuating plate position, float 120 is placed at the low fuel, or other, level, actuating plate 110 is turned to provide the corresponding resistance across terminals 132, 97, and the opposite end of float rod 118 is secured to actuating plate 110, such as by welding.

When sender 26 is installed in a fuel tank, float 120 will move up and down with changing fuel level. As a result, rod 118 turns actuating plate 110, and hence magnet return conductor 122, on enclosure 31 about axis 81. Movement 52 tracks return conductor 122 to correspondingly position contact 70 along resistor 86, causing resistance between terminals 97 and 132 to indicate the fuel level. The arrangement of various parts in the particular embodiment of sender 26 illustrated here provides that contact 70 is essentially midway along the arcuate length of resistor 86 when actuating plate 110 and magnet return conductor 122 are midway between limits of travel constrained by blade 134 and tab 136. When the fuel level falls to empty, the moving parts of sender 26 assume the solid line position shown in FIG. 1 where segment 124 is close to tab 136. When the fuel level rises to full, they assume the broken line position where segment 126 is close to blade 134. The travel allowed by blade 134 and tab 136 assures that contact 70 remains on resistor 86 for all positions of actuating plate 110. Hence, when the tank is empty, resistance between terminals 97 and 132 will be at its minimum reading; when the tank is full, resistance will be at maximum reading. A reverse of the resistance signal can be developed by making contact from terminal 95 to the far end of resistor 86 via a printed circuit buss bar on resistor card 84.

It is believed that the sender that has been described herein provides significant improvements in performance and durability that are quite cost-effective. The magnet can be economically fabricated by known magnet fabrication technology, magnet molding technology in particular being contemplated. The metal parts, such as the housing, actuating plate, and the contact arm and its mounting bracket can be fabricated from conventional materials using conventional metalworking techniques. The cover can be molded by conventional molding techniques to include the various features described.

Tight dimensional tolerances in a mass-produced bent wire part may be costly to achieve. Dimensional tolerances for the formed wire magnet return conductor 122 however need not be especially strict. It is the precision in stamping notches 128, 130 in the perimeter of actuating plate 110 that enable conductor 122 to have less strict tolerance because it is the notches that will control the locations of end segments 124, 126. Yoke portion 127 need merely allow member 122 to expand from its free unstressed state to spread end segments 124, 126 sufficiently apart to enable them to fit over actuating plate 110 so that when the wire is thereafter allowed to relax, the energy that has been imparted to the wire by expanding it will result in the yoke portion exerting retention force on the end segments urging them into the respective notches and thereafter keeping them in place in the notches. To the extent that such retention force may be considered insufficient, member 122 may be mechanically secured to actuating plate 110 by any suitable means, such as welding, or providing features in the actuating plate that are deformed or bent onto member 122.

It is possible to minimize movement hysteresis and maximize movement accuracy by making the radius of curvature of each magnet tip end 56, 58 equal to the radius of curvature of the outside diameter of the wire forming magnet return conductor 122.

The movement damping provided in the inventive sender may be especially desirable for significantly attenuating the effect of float flutter on the resistance output of the sender.

While a presently preferred embodiment has been illustrated and described, it is to be appreciated that the invention may be practiced in various forms within the scope of the following claims.

What is claimed is:

1. A fuel level sender disposed within a motor vehicle fuel tank for signaling the level of liquid fuel in the tank comprising:

an enclosure providing an interior that is sealed against intrusion of fuel;

an actuator that is positionable on an exterior of the enclosure in correlation with liquid fuel level;

a movement within the interior of the enclosure that follows the positioning of the actuator; and an electric circuit element within the interior of the enclosure that is operated by the movement to provide an electric characteristic for transmission through the enclosure to signal the liquid fuel level;

wherein both the actuator and the movement are arranged for circumferential positioning about a common axis, the movement comprises a magnet having opposite magnetic poles diametrically opposite each other about the axis, and the actuator comprises a return conductor for completing a magnetic circuit between the poles exterior to the enclosure.

2. A sender as set forth in claim 1 wherein the actuator further comprises an actuating member that is mounted on the enclosure for pivotal motion about the axis, and the actuating member carries the return conductor.

3. A sender as set forth in claim 2 wherein the return conductor comprises a formed metal wire having opposite end segments that are received in respective notches diametrically opposite each other in a perimeter edge of the actuating member, and that overlap, with clearance, a wall of the enclosure that is circular about the axis.

4. A sender as set forth in claim 3 wherein the formed metal wire further comprises a yoke that joins the two end segments for conducting magnetic flux from one end segment to the other, and that allows the wire to expand from a free unstressed state for spreading the end segments sufficiently apart to enable them to fit over the actuating member so that when the wire is thereafter allowed to relax, energy that has been imparted to the wire by expanding it will result in the yoke exerting retention force urging the end segments into the respective notches.

5. A sender as set forth in claim 2 wherein the enclosure comprises a rear wall having a center frontally of which extends a post on which the movement turns, and the actuating member is mounted on the rear wall.

6. A sender as set forth in claim 5 wherein the rear wall comprises an embossment forming both a pocket for mounting the post and a riser forming a bearing on which the actuating member turns.

7. A sender as set forth in claim 6 further including a keeper that is affixed to the riser behind the actuating member for capturing the actuating member on the riser.

8. A sender as set forth in claim 6 wherein the enclosure comprises a metal housing and a non-metallic cover assembled together to enclose the interior of the enclosure, the housing comprises the rear wall of the enclosure and has a perimeter wall that extends frontally of the rear wall concentric with the axis and ends in a rim that is crimped over and against a perimeter edge of the cover, and the cover comprises a blind hole for receiving a distal end of the post.

9. A sender as set forth in claim 8 wherein the electric circuit element comprises a resistor disposed on a card mounted on a face of the cover that is on the interior of the enclosure, the movement comprises a contact arm that turns about the axis with the magnet, traveling along the resistor as the magnet turns and coacting with the resistor to form a variable resistance, a first electric terminal on the exterior of the enclosure is mounted on the cover to have electric contact with a fixed location on the resistor, and a second electric terminal on the exterior of the enclosure is mounted on the housing to have electric contact with the contact arm via the movement, whereby variable resistance is presented between the terminals as the movement turns.

10. A sender as set forth in claim 9 wherein the return conductor comprises a formed metal wire having opposite end segments that are received in respective notches diametrically opposite each other in a perimeter edge of the actuating member, and that overlap, with clearance, the perimeter wall of the housing, the second electric terminal comprises a blade and a tab that are spaced apart about the axis and disposed for abutment by respective ones of the wire end segments to constrain pivotal motion of the actuating member to a range that keeps the contact arm on the resistor.

11. A sender as set forth in claim 1 wherein the magnet comprises narrowing tapers leading to tip ends at its diametrically opposite magnetic poles, the actuator comprises an actuating member that is mounted on the enclosure for pivotal motion about the axis with the return conductor being carried by the actuating member for completing a magnetic circuit between the magnet poles, and the return conductor comprises a formed metal wire having opposite end segments that are received in respective notches diametrically opposite each other in a perimeter edge of the actuating member, and that overlap, with clearance, a wall of the enclosure that is circular about the axis.

12. A sender as set forth in claim 11 wherein the formed metal wire further comprises a yoke that joins the two end segments for conducting magnetic flux from one end segment to the other, and that allows the wire to expand from a free unstressed state for spreading the end segments sufficiently apart to enable them to fit over the actuating member so that when the wire is thereafter allowed to relax, energy that has been imparted to the wire by expanding it will result in the yoke exerting retention force urging the end segments into the respective notches.

13. A sender as set forth in claim 11 wherein the movement further comprises a contact arm that turns about the axis with the magnet and is arranged at a right angle to the length of the magnet as measured between its tip ends.

14. A sender as set forth in claim 13 wherein the enclosure comprises a non-magnetic, electrically conductive metal housing and a non-metallic cover assembled together to enclose the interior of the enclosure, the electric circuit element comprises a resistor disposed on a card mounted on a face of the cover that is on the interior of the enclosure, the contact arm is resiliently flexed to force a contact at a distal end of the contact arm against the resistor, a first electric terminal on the exterior of the enclosure is mounted on the cover to have electric contact with a fixed location on the resistor, and a second electric terminal on the exterior of the enclosure is mounted on the housing to have electric contact with the contact arm via the movement.

15. A sender as set forth in claim 11 wherein each of the opposite end segments of the formed wire has, as viewed along a direction parallel to the axis, a circular radius of curvature toward a respective tip end of the magnet, each of the tip ends of the magnet has a respective circular radius of curvature toward a respective end segment of the formed wire, and the circular radius of curvature of each tip end is substantially equal to the circular radius of curvature of the respective confronting end segment of the formed wire.

16. A sender as set forth in claim 1 including a damping and lubricating fluid disposed within the interior of the enclosure for damping and lubricating motion of the movement.

17. A method for calibrating a fuel level sender of the type that signals the level of liquid fuel in a motor vehicle fuel tank and comprises an enclosure having an interior containing a movement that turns about an axis in correlation with the turning of an actuator on an exterior of the enclosure about the axis, an electric circuit element within the interior of the enclosure that is associated with the movement to provide an electric characteristic for transmission through the enclosure to signal the liquid fuel level, the method comprising:

providing the circuit element on a cover of the enclosure that can be turned on a housing of the enclosure during calibration;

positioning the actuator about the axis to a position corresponding to a selected fuel level;

positioning the cover on the housing to a position that provides the electric characteristic with a value corresponding to the selected fuel level;

securing the cover to the housing to keep the cover in the position that provides the electric characteristic with the value corresponding to the selected fuel level; and     then positioning the actuator about the axis to a position corresponding to a certain fuel level, and affixing a float arm that includes a float to the actuator while the float is disposed at the same certain fuel level relative to the enclosure.

18. A sender comprising:

a casing that separates an actuator of poor magnetic permeability that is positionable on the casing from a movement that is positionable on the casing; and     a magnetic circuit via which the actuator positions the movement, the magnetic circuit comprising a first part on the movement and a second part on the actuator;

wherein the second part comprises a formed wire having segments through which magnetic flux passes between the two parts and which are located on the actuator by locating features formed in the actuator.

* * * * *